Oct. 2, 1962    E. GLASER ETAL    3,056,382
SOOT PREVENTION DEVICE FOR FLAME CURING ENAMELED PLATE
Filed Dec. 2, 1959    2 Sheets-Sheet 1
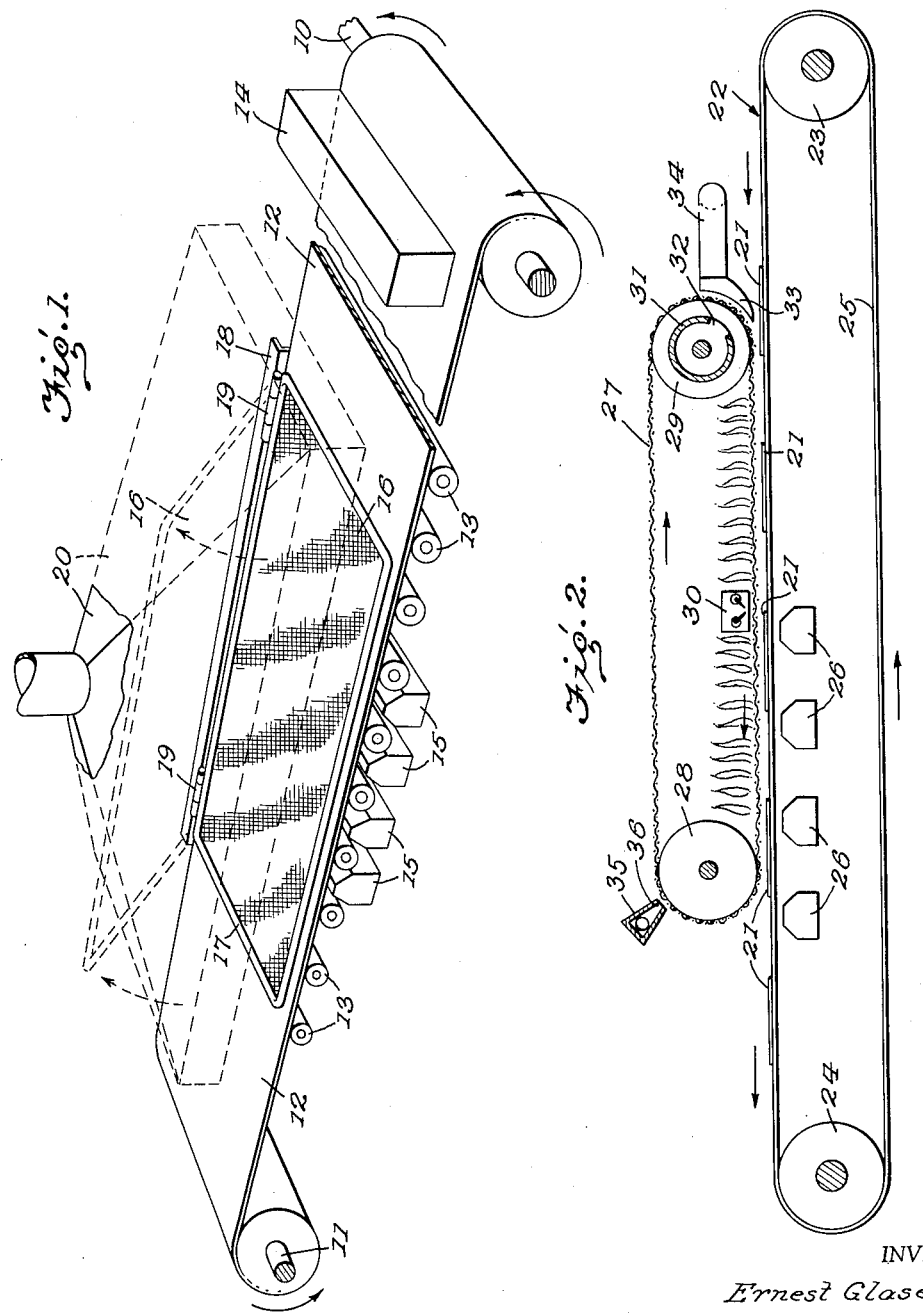
INVENTORS
Ernest Glaser
Ruhl Titus Schenck
BY
Mason, Porter, Diller & Stewart
ATTORNEYS

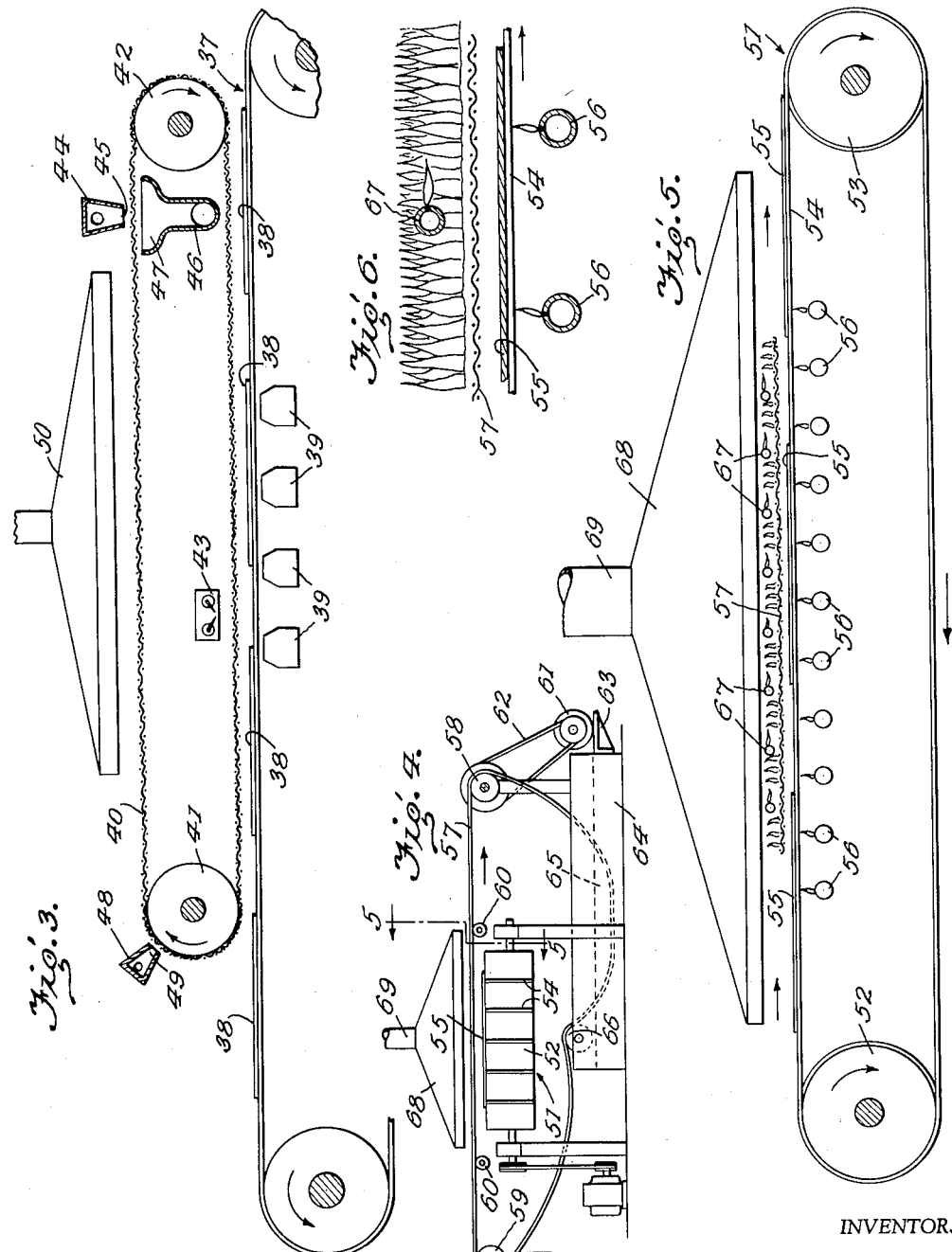

United States Patent Office 3,056,382
Patented Oct. 2, 1962

3,056,382
SOOT PREVENTION DEVICE FOR FLAME CURING ENAMELED PLATE
Ernest Glaser and Ruhl Titus Schenck, Chicago, Ill., assignors to Continental Can Company, Inc., New York, N.Y., a corporation of New York
Filed Dec. 2, 1959, Ser. No. 856,694
15 Claims. (Cl. 118—47)

This invention relates in general to new and useful improvements in the art of flame curing enameled plate, and more specifically relates to a novel soot-preventing device for use in the flame curing of enameled plate.

It is well known in the art of can making that the inside of a metal can body must usually have a lining of enamel to protect the can from the product, or to protect the product from the chemical influence of the metal can. For example, some canned products, such as spinach, are so highly corrosive that the can will deteriorate rapidly unless the can is lined with a specially prepared enamel. On the other hand, cherries, for example, when packed in a tin can, will bleach or fade unless the can is lined with a specially prepared enamel.

The first step in curing an enamel coating on a metal surface is the removal of the solvent of the enamel. Rapid solvent removal is, therefore, of prime importance in obtaining fast curing of the enamel. This can be achieved in one of two ways. First, high velocity, high temperature air currents may sweep the surface of the enamel coating and carry with them the evaporating solvent. Secondly, the metal sheet may be heated to drive off the solvents, which are then removed by burning them. In the second mentioned method, which is part of the flame curing process, special, more expensive solvent formulations are necessary in order to prevent a sooty appearance of the enamel coating. Specifically, aromatic and hydrocarbon solvents, which cost about 40¢ per gallon, have to be replaced by ketones and alcohols, which cost about 11¢–15¢ per pound.

The present invention proposes to eliminate the requirement for expensive ketones and alcohols as solvents, and at the same time prevent the sooty appearance of the enamel coating by providing a screen above the metal which is to be cured, the screen being in the form of a flash-preventing screen which will eliminate the burning of the solvents closely adjacent the coated sheet, which, in turn, will eliminate the sooty appearance of the enamel coating.

Another object of the invention is to provide a flash screen in conjunction with an apparatus for flame curing enamel coatings, the screen being spaced above the path of the coated metal a sufficient distance to prevent the deterioration of the coating by the presence of soot, the screen confining the burning of the solvent-air mixture to an area above the screen.

Another object of the invention is to provide a novel apparatus for enamel coating and flame curing a continuous metal strip with the elimination of the sooty appearance of the enamel coating, the apparatus including a feed roll and a take-up roll which are disposed in spaced relation and which have a coil of strip metal mounted thereon, an enamel coating apparatus disposed adjacent the feed roll for applying enamel to a surface of the strip metal, burners beneath the path of the strip metal for heating the metal of the strip and driving off the solvents of the enamel, a flash-preventing screen disposed above the heated area for confining the burning of the solvents, when combined with air, to an area spaced above the strip metal, and an igniter disposed above the screen for igniting and insuring the burning of the solvents.

A further object of the invention is to provide a flash-preventing screen in conjunction with a flame curing apparatus for enamel coated metal sheets, the flash-preventing screen being in the form of an endless screen which will continuously present cool surfaces to be exposed to the flame utilized in the heating of the metal sheets to drive off the solvents of the enamel coating thereon, and there being provided means for removing soot which accumulates on the screen as the solvents, which have been driven from the enamel coating, are burned above the screen.

Still another object of the invention is to provide a novel method of preventing the sooty appearance of enamel coatings normally resulting from a flame curing operation, the method including the placing of a flash screen above the heated area of the flame curing apparatus to prevent the burning of a solvent-air mixture directly above the coated metal so as to remove the soot from the area of the coated metal and permit such soot to be accumulated on the flash screen.

A still further object of the invention is to provide a flame curing apparatus for the flame curing of freshly enamel coated metal sheets, the apparatus including a conveyor for moving the metal sheets, heating means for heating the metal sheets to drive the solvents from the enamel coating, a flash screen disposed above the area of the heating means for preventing the burning of the solvents in air immediately above the coated metal sheets, and ignition means disposed above the screen for igniting the combustible solvent-air mixture so as to remove the solvents by burning them, the screen being in the form of an endless screen, and there being provided air blast means for removing soot from the screen and thus cleaning the screen, and other air blast means for cooling the screen so that a cool surface may be continuously presented as the screen is driven.

With the above, and other objects in view that will hereafter appear, the nature of the invention will be more clearly understood by reference to the following detailed description, the appended claims, and the several views illustrated in the accompanying drawings:

In the drawings:

FIGURE 1 is a perspective view of an apparatus for enamel coating and flame curing such enamel coating a continuous metal strip in accordance with the invention.

FIGURE 2 is an elevational view of an apparatus for flame curing enamel coated metal sheets in accordance with the invention.

FIGURE 3 is an elevational view showing an apparatus similar to FIGURE 2, but with a modified form of screen cleaning means.

FIGURE 4 is an elevational view showing a modified form of flame curing apparatus, the view being on a reduced scale and taken from one end of the apparatus.

FIGURE 5 is an enlarged fragmentary vertical sectional view, taken generally along the line 5—5 of FIGURE 4 and shows the general relation of the flash preventing screen with respect to the remainder of the flame curing apparatus.

FIGURE 6 is an enlarged fragmentary longitudinal sectional view taken through the central portion of the flame curing apparatus, and shows further the details thereof.

A first illustrated embodiment of the invention is illustrated in FIGURE 1 of the drawings. The apparatus disclosed here is for the enamel coating and flame curing of a continuous strip of metal provided in coil form. The apparatus includes a feed roll 10 and a take-up roll 11, the two rolls being disposed in spaced relation. An elongated metal strip 12, which is provided in coil form, is mounted on the feed roll 10 and extends to the take-up roll 11, the metal strip 12 being fed from the feed roll 10 to the take-up roll 11, as indicated by the arrows. The metal strip 12 is supported intermediate the feed roll 10 and the take-up roll 11 by a plurality of individual supporting rolls 13.

A conventional type of enamel coating apparatus, illustrated in block form, is disposed adjacent the feed roll 10. The coating apparatus is referred to by the numeral 14 and may be of any type.

Disposed adjacent the coating apparatus 14 and underlying the metal strip 12 are a plurality of heaters 15. The heaters 15 extend transversely of the path of movement of the metal strip 12, and entirely across the width of the metal strip 12 for heating the entire metal strip 12 from the underside thereof. Normally, the heaters 15 will be gas heaters and have open flames, although it is contemplated that other types of heaters, including high frequency induction heaters, may be utilized.

As the coated metal strip 12 passes over the heaters 15, the wet enamel will be heated to a sufficiently high temperature to drive off the solvents therefrom. On the other hand, the temperature will not be sufficiently high to bring about spontaneous combustion of the solvents as they mix with the air. While it is not desired to have a mixture which is capable of spontaneous combustion, it is desirable that the solvents do mix with the air to form a combustible mixture. In accordance with the flame curing process, the combustible mixture is burned.

The burning of a combustible solvent-air mixture closely adjacent an enamel coating will result in the sooty appearance of the enamel coating unless expensive solvents are utilized. The present invention proposes to eliminate the sooty appearance of the enamel coating by restricting the burning of the solvent-air mixture to an area spaced from the strip metal 12. This is accomplished by placing a flash screen 16 above the area of the heaters 15 where the solvent is driven off of the enamel coated metal strip 12. In the form of the invention illustrated in FIGURE 1, the screen 16 is mounted in a frame 17, which frame 17 is supported by a suitable support 18 through hinges 19. The screen 16, together with its frame 17, is thus free to be swung to a position spaced from the metal strip 12, as is shown by dotted lines in FIGURE 1, for the purpose of cleaning soot from the screen 16.

As the combustible solvent-air mixture passes through the screen 16, it is ignited by suitable ignition means. The ignition means may be of the electrical spark type or may incorporate a pilot burner. The ignition means have been omitted from FIGURE 1 for the purposes of clarity.

The apparatus of FIGURE 1 also includes an exhaust hood 20 for the removal of the exhaust gases after a solvent-air mixture has burned. The exhaust hood 20 also brings about the drawing in of additional air beneath the screen 16 to insure sufficient air for forming the combustible solvent-air mixture.

It is pointed out that the metal strip 12 completely overlies the heater means 15, with the result that there is no direct heating of the flash screen 16. Accordingly, cooling of the screen 16 does not present a problem.

A second form of flame curing apparatus is illustrated in FIGURE 2. The flame curing apparatus of this figure is particularly designed for handling freshly enameled sheets 21. The flame curing apparatus includes an endless conveyor, generally referred to by the numeral 22. The endless conveyor 22 includes a pair of drums 23 and 24, one of which is driven. A plurality of transversely spaced, endless cables 25 are entrained over the drums 23 and 24. The spacing between the cables 25 is insufficient for the passage of a sheet 21 therebetween.

The enamel coated sheets 21 move along the upper run of the endless conveyor 22. A plurality of heaters 26 underlie the upper run of the endless conveyor 22, the heaters 26 being disposed intermediate the two runs of the cables 25. The heaters 26 may either be of the flame type or may be in the form of a high frequency induction heater. The heaters 26 heat the metal of the sheets 21 which, in turn, heats the enamel coating to drive the solvents therefrom.

In accordance with the invention, a soot preventing screen 27 is disposed in spaced relation above the path of the sheets 21 in the general area of the heaters 26. The screen 27 is of the endless type and is supported by a pair of drums 28 and 29, of which one is driven. It is to be noted that the bottom run of the screen 27 is disposed substantially parallel to the top run of the endless conveyor 22.

The screen 27 is closely woven and prevents the flashing of a solvent-air mixture therebelow. The solvent-air mixture passes up through the screen and is ignited by means of an ignition device 30 which is disposed above the bottom run of the screen 27.

It is to be noted that the drum 29 is a partial drum and is provided with an intermediate air pipe 31 having an elongated slotted type opening 32 through which air is directed onto the screen 27 from the inner side thereof. The air from the air pipe 31 cleans the soot from the screen 27. The soot is collected by a collection head 33 which has attached thereto a suction pipe 34. The soot may be discharged into the atmosphere along with other products of combustion. However, this may be objectionable in many urban localities, and a soot collecting device (not shown) may be utilized in the exhaust system in order to prevent the contamination of the surrounding atmosphere.

A second air tube 35 extends transversely of the screen 27 in the area of the drum 28. The air tube 35 has an elongated outlet 36 which extends transversely of the screen 27 and directs cooling air onto the screen 27 to assure the cooling of the screen before it returns to overlying relation with respect to the burning gases. The screen is preferably cooled to a temperature below the dew point of the gases of combustion so that the moisture will condense on the screen upper run and aid in the adhering of the soot thereto.

Although a hood, such as the hood 20 of FIGURE 1, has not been illustrated, it may be provided for taking off the exhaust gases resulting from the burning of the solvent.

A slightly modified form of flame curing apparatus from that illustrated in FIGURE 2 is illustrated in FIGURE 3. The flame curing apparatus of FIGURE 3 includes an endless conveyor, generally referred to by the numeral 37, which transports the sheets having a wet freshly applied enamel coating thereon, the sheets being referred to by the numeral 38. The endless conveyor 37 is of the same construction as the endless conveyor 22, and further description thereof is believed to be unnecessary.

A plurality of heaters 39, which may be identical with the heaters 26, are disposed below the top run of the endless conveyor 37 for the purpose of heating the sheets 38 to drive off the solvents from the enamel coatings thereof. In order to restrict combustion of the solvent-air mixture resulting from the driven off solvents, a flash screen 40 is disposed above the path of the sheets 38. The flash screen 40 is in the form of an endless belt and is mounted on a pair of drums 41 and 42, one of which is driven. The bottom run of the screen 40 is disposed generally parallel to the top run of the endless conveyor 37. An igniter 43 for the solvent-air mixture is disposed above the bottom run of the screen 40. The igniter may be of any desired construction, including a spark type igniter or a flame type pilot.

During the burning of the solvent-air mixture, soot accumulates on the screen 40. In order to facilitate the removal of soot which accumulates on the screen 40, an air pipe 44 extends above the top run of the screen 40 adjacent the drum 42. The air pipe 44 has a bottom discharge opening 45 which extends transversely of the screen 40. A suction pipe 46 is disposed intermediate the runs of the screen 40 and underlies the air pipe 44. The suction pipe 46 has a relatively large mouth 47 aligned with the discharge opening 45 of the air pipe 44 to receive air discharged from the pipe 44 and soot collected thereby during the passage of such air through the screen 40.

A second air duct 48 extends transversely of the screen 40 adjacent the drum 41. The air duct 48 has a discharge opening 49 which opens transversely of the screen 40 and which directs cooling air onto the screen 40. The screen moves in a clockwise direction which results in the cooling of the upper run of the screen prior to the passage thereof over the burning gases. It is desired that the screen upper run be cooled below the dew point of the gases of combustion so that the water vapors carried thereby will condense and aid in the clinging of the soot to the upper run of the screen.

A hood 50, such as the hood 20, is illustrated in overlying relation to the solvent burning area for receiving exhaust gases therefrom. The exhaust gases may be exhausted into the atmosphere, or they may be combined with the exhaust gases from the exhaust pipe 46 and passed through a suitable coot collecting device.

Still another form of flame curing apparatus is illustrated in FIGURES 4, 5 and 6. The flaming curing apparatus of these figures includes an endless conveyor, generally referred to by the numeral 51. The endless conveyor 51 includes a pair of drums 52 and 53, one of which is driven. A plurality of transversely spaced cables 54 are entrained over the drums 52 and 53. The spacing of the cables 54 is such that they will properly support metal sheets 55 which have the upper surfaces thereof provided with a wet, freshly applied enamel coating.

A plurality of burners 56 underlie the top run of the cables 54 to heat the metal sheets 55. In heating the metal sheets 55, the solvents of the enamel coating are driven off. Incidentally, it is pointed out that while the heaters 56 have been illustrated as being of the flame type, they may also be of the induction heating type.

A screen 57 is disposed above the path of the sheets 55 for preventing the combustion of the solvent-air mixture. As is best illustrated in FIGURE 4, the screen 57 is of the endless type, and passes over the conveyor 51 transversely thereof. The screen 57 is supported by a main drum 58 and an idler drum 59, which are horizontally aligned. Roller type supports 60 are disposed on opposite sides of the conveyor 51 to support the screen 57 in the vicinity of the conveyor 51.

The drum 58 is driven by an electric motor 61 through a drive belt 62. The electric motor 61 is supported on a platform 63 at the end of a tank 64 for a cleaning bath 65. The screen 57 passes from the drum 58 down into the cleaning bath 65, and then up and over a roller 66 before returning around the drum 59. In this manner, soot which may accumulate on the screen 57 is removed. The cleaning bath 65 will also aid in the cooling of the screen 57.

A plurality of flame type igniters 67 are disposed above the top run of the screen 57 to ignite the solvent-air mixture. In this manner, the burning of the solvent-air mixture is confined to the area above the screen 57.

An exhaust hood 68 is disposed above the screen 57 and the central portion of the endless conveyor 51 for removing exhaust gases resulting from the burning of the solvent. The hood 68 is provided with a suitable exhaust pipe 69 which will exhaust the gases.

The several screens illustrated and described herein may be in the form of such flame resistant materials as wire mesh, a metal sponge, a porous mineral aggregate, and fiber glass cloth.

The foregoing represents example variations of the use of a screen in conjunction with a flame curing apparatus to prevent the burning of the solvent immediately adjacent the enamel coated surface. It is to be understood that other variations of screen structure may be provided within the scope of the invention, as defined in the appended claims.

We claim:
1. An apparatus for applying enamel to a metal strip and curing the freshly applied enamel by driving off the solvents therefrom comprising a feed roll for supporting and paying out metal strip in coil form to be coated, a take-up roll remote from said feed roll for rewinding the metal strip, a plurality of intermediate strip supporting rolls, a strip coater adjacent said feed roll for applying enamel to the metal strip, means for heating said metal strip for driving off solvents from the coating media at a temperature below the temperature required for spontaneous combustion of the solvents, a porous flash preventing screen spaced above said heaters and the path of movement of the metal strip, and means for igniting a combustible mixture of the solvents and air above said screen.

2. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, and a porous flash preventing screen overlying and spaced above said conveyor in the area of said heating means to restrict the burning of the combustible mixture to an area above said screen.

3. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, a porous flash preventing screen overlying and spaced above said conveyor in the area of said heating means to restrict the burning of the combustible mixture to an area above said screen, and ignition means above said screen for igniting said combustible mixture.

4. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, a porous flash preventing screen overlying and spaced above said conveyor in the area of said heating means to restrict the burning of the combustible mixture to an area above said screen, and means for cleaning soot from said screen during the operation of the apparatus.

5. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, a porous flash preventing screen overlying and spaced above said conveyor in the area of said heating means to restrict the burning of the combustible mixture to an area above said screen, and an exhaust hood above said screen.

6. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, a porous flash preventing screen overlying and spaced above said conveyor in the area of said heating means to restrict the burning of the combustible mixture to an area above said screen, ignition means above said screen for igniting said combustible mixture, and means for cleaning soot from said screen during the operation of the apparatus.

7. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, a porous flash preventing screen overlying and spaced above said conveyor in the area of said heating means to restrict the burning of the combustible mixture to an area above said screen, ignition means above said screen for igniting said combustible mixture, and an exhaust hood above said screen.

8. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, a porous flash preventing screen overlying and spaced above said conveyor in the area of said heating means to restrict the burning of the combustible mixture to an area above said screen, ignition means above said screen for igniting said combustible mixture, an exhaust hood above said screen, and means for cleaning soot from said screen during the operation of the apparatus.

9. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, and a porous flash preventing screen overlying and spaced above said conveyor in the area of said heating means to restrict the burning of the combustible mixture to an area above said screen, said screen being an endless screen extending in the direction of movement of the sheet material.

10. An apparatus for curing wet freshly applied enamel on sheet material wherein the enamel has solvents, said apparatus comprising a conveyor for sheet material, heating means positioned below said conveyor for heating the sheet material as the sheet material is moved by said conveyor to drive off the solvents with the solvents combining with the air to form a combustible mixture, and a porous flash preventing screen overlying and spaced above said conveyor in the area of said heating means to restrict the burning of the combustible mixture to an area above said screen, said screen being an endless screen extending transversely of the direction of movement of the sheet material.

11. In apparatus for curing wet freshly applied enamel on sheet material wherein the enamel has solvents which are driven off by the heating of the sheet material, and the solvents combine with air to form a combustible mixture which is burned; a soot preventing device for eliminating soot from the sheet material, said soot preventing device being in the form of a flash preventing screen spaced above the path of the sheet material, said screen comprising a moving endless screen constantly presenting relatively cool areas to the solvent burning area.

12. In an apparatus for curing wet freshly applied enamel on sheet material wherein the enamel has solvents which are driven off by the heating of the sheet material, and the solvents combine with air to form a combustible mixture which is burned; a soot preventing device for eliminating soot from the sheet material, said soot preventing device being in the form of a flash preventing screen spaced above the path of the sheet material, said screen comprising a moving endless screen constantly presenting relatively cool areas to the solvent burning area, and there also being included means for cleaning soot from said screen during the use thereof.

13. In an apparatus for curing wet freshly applied enamel on sheet material wherein the enamel has solvents which are driven off by the heating of the sheet material, and the solvents combine with air to form a combustible mixture which is burned; a soot preventing device for eliminating soot from the sheet material, said soot preventing device being in the form of a flash preventing screen spaced above the path of the sheet material, said screen comprising a moving endless screen constantly presenting relatively cool areas to the solvent burning area, and there also being included a screen cleaning bath receiving said screen remote from said solvent burning area.

14. In an apparatus for curing wet freshly applied enamel on sheet material wherein the enamel has solvents which are driven off by the heating of the sheet material, and the solvents combine with air to form a combustible mixture which is burned; a soot preventing device for eliminating soot from the sheet material, said soot preventing device being in the form of a flash preventing screen spaced above the path of the sheet material, said screen comprising a moving endless screen constantly presenting relatively cool areas to the solvent burning area, and there also being included air blast means for cleaning soot from said screen.

15. In an apparatus for curing wet freshly applied enamel on sheet material wherein the enamel has solvents which are driven off by the heating of the sheet material, and the solvents combine with air to form a combustible mixture which is burned; a soot preventing device for eliminating soot from the sheet material, said soot preventing device being in the form of a flash preventing screen spaced above the path of the sheet material, said screen comprising a moving endless screen constantly presenting relatively cool areas to the solvent burning area, and there also being included air blast cooling means directed onto said screen, and air blast means for cleaning soot from said screen.

References Cited in the file of this patent

UNITED STATES PATENTS

| | | |
|---|---|---|
| 1,752,857 | Seede | Apr. 1, 1930 |
| 1,841,484 | Larsen | Jan. 19, 1932 |
| 2,220,928 | Kienle | Nov. 12, 1940 |
| 2,483,681 | Van Der Neut | Oct. 4, 1949 |
| 2,517,024 | Prescott et al. | Aug. 1, 1950 |
| 2,658,742 | Suter et al. | Nov. 10, 1953 |